(12) United States Patent
Shumarayev et al.

(10) Patent No.: US 8,743,943 B2
(45) Date of Patent: Jun. 3, 2014

(54) HIGH-SPEED DATA RECEPTION CIRCUITRY AND METHODS

(75) Inventors: Sergey Yuryevich Shumarayev, San Leandro, CA (US); Wilson Wong, San Francisco, CA (US); Rakesh Patel, Cupertino, CA (US)

(73) Assignee: Altera Corporation, San Jose, CA (US)

( * ) Notice: Subject to any disclaimer, the term of this patent is extended or adjusted under 35 U.S.C. 154(b) by 1303 days.

(21) Appl. No.: 11/192,539

(22) Filed: Jul. 28, 2005

(65) Prior Publication Data

US 2007/0025436 A1 Feb. 1, 2007

(51) Int. Cl.
*H03H 7/30* (2006.01)
*H03H 7/40* (2006.01)
*H03K 5/159* (2006.01)

(52) U.S. Cl.
USPC ............ 375/233; 375/229; 375/230; 375/232

(58) Field of Classification Search
None
See application file for complete search history.

(56) References Cited

U.S. PATENT DOCUMENTS

| | | | | |
|---|---|---|---|---|
| 3,974,449 | A * | 8/1976 | Falconer | 375/233 |
| 5,402,445 | A * | 3/1995 | Matsuura | 375/229 |
| 5,491,518 | A * | 2/1996 | Kim | 348/607 |
| 5,701,352 | A * | 12/1997 | Williamson, III | 381/104 |
| 6,226,322 | B1 | 5/2001 | Mukherjee | |
| 6,515,713 | B1 * | 2/2003 | Nam | 348/614 |
| 6,650,140 | B2 | 11/2003 | Lee et al. | |
| 6,867,616 | B1 | 3/2005 | Venkata et al. | |
| 6,870,404 | B1 | 3/2005 | Maangat | |
| 6,904,088 | B1 * | 6/2005 | Brecher et al. | 375/233 |
| 6,961,423 | B2 * | 11/2005 | Pessoa et al. | 379/406.08 |
| 7,027,503 | B2 * | 4/2006 | Smee et al. | 375/233 |
| 7,047,457 | B1 * | 5/2006 | Black et al. | 714/712 |
| 7,526,023 | B1 * | 4/2009 | Shumarayev | 375/233 |
| 2001/0033188 | A1 | 10/2001 | Aung et al. | |
| 2002/0106040 | A1 * | 8/2002 | Malkemes et al. | 375/347 |
| 2003/0048840 | A1 * | 3/2003 | Ling et al. | 375/232 |
| 2003/0138039 | A1 * | 7/2003 | Greiss et al. | 375/232 |
| 2003/0185295 | A1 * | 10/2003 | Yousef | 375/233 |
| 2003/0185310 | A1 * | 10/2003 | Ketchum et al. | 375/259 |
| 2003/0223489 | A1 | 12/2003 | Smee et al. | |
| 2004/0001540 | A1 * | 1/2004 | Jones | 375/231 |
| 2004/0140837 | A1 | 7/2004 | Venkata et al. | |
| 2004/0258145 | A1 * | 12/2004 | Popescu et al. | 375/232 |

(Continued)

FOREIGN PATENT DOCUMENTS

| | | |
|---|---|---|
| EP | 1 096 746 A2 | 5/2001 |
| JP | 2000-049666 | 2/2000 |
| WO | WO 03/103246 | 12/2003 |

OTHER PUBLICATIONS

C. Laot et al., "Improved Blind Decision Feedback Equalizer with Self-Adapted Structure for High Order QAM Signals," ICT, International Conference on Telecommunications, Bridging East and West Through Telecommunications, 1998, pp. 475-478.

*Primary Examiner* — Shuwang Liu
*Assistant Examiner* — Gina McKie (57) ABSTRACT

Equalization circuitry for receiving a digital data signal includes both feed-forward equalizer ("FFE") circuitry and decision-feedback equalizer ("DFE") circuitry. The FFE circuitry may be used to give the DFE circuitry a signal that is at least minimally adequate for proper start-up of the DFE circuitry. Thereafter, more of the burden of the equalization task may be shifted from the FFE circuitry to the DFE circuitry.

39 Claims, 7 Drawing Sheets

(56) References Cited

U.S. PATENT DOCUMENTS

| | | |
|---|---|---|
| 2005/0025229 A1* | 2/2005 | Jones et al. .................. 375/232 |
| 2005/0052255 A1* | 3/2005 | Chiang ......................... 333/18 |
| 2005/0095988 A1 | 5/2005 | Bereza et al. |
| 2005/0163252 A1* | 7/2005 | McCallister et al. ......... 375/296 |
| 2006/0007997 A1* | 1/2006 | Jones ............................ 375/231 |
| 2007/0201544 A1* | 8/2007 | Zhu et al. ..................... 375/229 |
| 2008/0260017 A1* | 10/2008 | Tsuie et al. ................... 375/233 |
| 2009/0268800 A1* | 10/2009 | Takaoka ....................... 375/232 |

* cited by examiner

HIGH-SPEED DATA RECEPTION CIRCUITRY AND METHODS

BACKGROUND OF THE INVENTION

This invention relates to circuitry and methods for receiving a high-speed data signal. For example, the circuitry of this invention may be provided on a programmable logic device ("PLD"), and the methods of the invention may be methods of operating the circuitry.

A so-called high speed serial interface ("HSSI") may be used to communicate between devices in a system. Typically, it is the intention for the transmitter in such a system to transmit a digital (binary) signal having two distinctive levels, and well-defined (i.e., very steep) transitions from either of these levels to the other level. Such steep transitions are essential to transmitting data at high speed. The medium that conveys the signal from the transmitter to the receiver usually imposes losses on the signal being transmitted. These losses generally include diminished signal amplitude and reduced transition steepness. To maintain accurate, high-speed data transmission, it is necessary for the circuitry to compensate for these losses.

One way to do this is for the transmitter to give the signal pre-emphasis. This means giving the signal extra energy immediately after each transition. The extra energy can be extra amplitude (voltage) and/or current. At very high data rates (e.g., in the range of about 3 gigabits per second (3 Gbps) and above), pre-emphasis can have the disadvantage of giving the signal being transmitted high frequency components that can undesirably couple to other circuitry.

To avoid the above-described disadvantages of pre-emphasis, it may be preferable to use what is called equalization at the receiver. Equalization circuitry is typically among the first circuitry that the incoming signal sees when it reaches the receiver. Equalization circuitry is designed to respond strongly and rapidly to any transition detected in the received signal. This strong and rapid response restores the original steepness to these transitions, thereby making it possible for further circuitry of the receiver to correctly interpret the signal, even at the very high data rate of that signal.

Especially in the case of equalization circuitry that is intended for inclusion in a PLD, a need exists for such circuitry that can perform over a wide range of data rates, and that can compensate for signal losses of various kinds and degrees. This is so because PLDs are typically designed for a wide range of possible uses. The exact parameters of any particular use are not known in advance. The PLD must be customizable by the user and/or be self-adapting to meet the requirements of each particular use within the relatively wide range of possible uses. Improved equalization circuitry is therefore sought for this type of application.

SUMMARY OF THE INVENTION

Improved equalization circuitry in accordance with the invention includes feed-forward equalizer ("FFE") circuitry that receives an applied data signal and performs analog equalization on that circuitry. The output signal of the FFE circuitry is combined with a selectively enabled feedback signal, and the resulting signal is applied to data recovery circuitry (e.g., clock and data recovery or CDR circuitry). The retimed data signal that is output by the CDR circuitry is applied to decision-feedback equalizer ("DFE") circuitry, which performs a digital-filter-type equalization operation on the retimed data signal. The output signal of the DFE circuitry is the above-mentioned selectively enabled feedback signal that is combined with the output signal of the FFE circuitry.

The circuitry may be operated so that initially most or all of any equalization performed is performed by the FFE circuitry. As operation of the circuitry continues, more of the equalization task may be shifted to the DFE circuitry.

Either or both of the FFE and DFE may be controllable with respect to the kind and/or degree of equalization performed. The FFE may be part of an adaptive or self-adapting loop. In a PLD embodiment of the invention, other circuitry of the PLD may be used to monitor and/or control the performance of the FFE and/or DFE. This monitoring and/or control may include controlling the above-mentioned shifting of the equalization task from the FFE to the DFE.

Further features of the invention, its nature and various advantages, will be more apparent from the accompanying drawings and the following detailed description.

DETAILED DESCRIPTION

Figure 1:
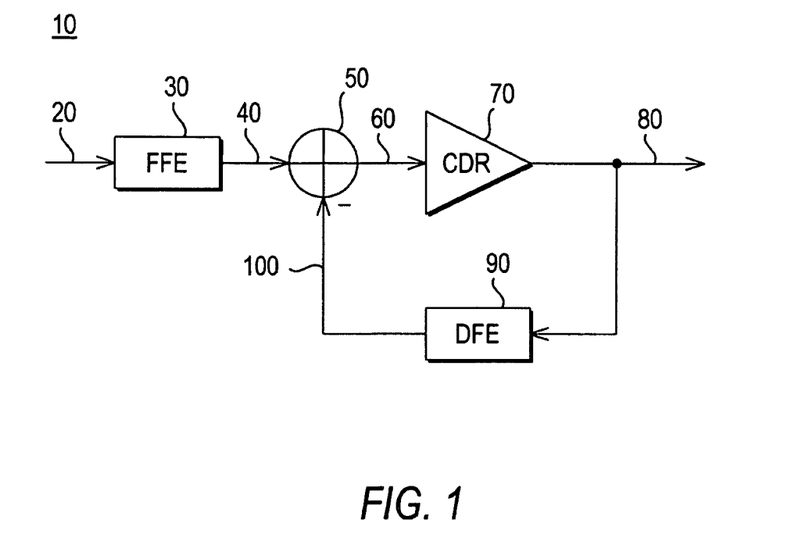
FIG. 1 is a simplified schematic block diagram of an illustrative embodiment of circuitry constructed in accordance with the invention.

FIG. 1 shows illustrative circuitry 10 in accordance with the invention. Circuitry 10 includes feed-forward equalizer circuitry 30 that receives an incoming digital data signal 20 to be equalized and further processed by the receiver. It is assumed in this discussion that the receiver comprises a programmable logic device ("PLD"). It is further assumed (1) that the PLD is manufactured to support a wide range of possible uses, (2) that the use to which circuitry 10 is put in the example described herein is generally within the range of uses supportable by the PLD, but (3) that all of the precise characteristics of that particular use may not be known by the manufacturer of the PLD. Indeed, even the user of the PLD may not know in the advance the precise equalization that will be needed in each system that employs circuitry 10. Among the variations that circuitry 10 is designed to accommodate as a general matter are different data rates and different kinds and amounts of losses that have been experienced by signal 20 prior to reaching circuitry 10.

Feed-forward equalizer ("FFE") circuitry 30 is preferably analog equalizer circuitry that is designed to give extra boost to each transition in signal 20. FFE circuitry 30 is preferably not limited to any particular data rate of signal 20. Rather, FFE circuitry 30 is preferably broadly capable of giving boost to transitions in signal 20 over a wide range of possible data rates. FFE circuitry 30 may be adaptive in one or more respects, so that it can determine for itself to some degree such things as how much boost to give signal 20 transitions, what frequency components to use for such boost, etc. FFE circuitry 30 may also be alternatively or additionally controllable (e.g., by associated PLD circuitry) in some or all of the above-mentioned respects. Examples of circuitry that can be used for FFE circuitry are shown in references such as Bereza et al. U.S. patent application Ser. No. 10/702,196, filed Nov. 4, 2003, Maangat U.S. Pat. No. 6,870,404, Wong et al. U.S. patent application Ser. No. 10/762,864, filed Jan. 21, 2004, Wong et al. U.S. patent application Ser. No. 10/853,987, filed May 25, 2004, and Wang et al. U.S. patent application Ser. No. 10/967,459, filed Oct. 18, 2004.

The output signal 40 of FFE circuitry 30 is applied to one input terminal of analog combiner (e.g., subtractor) circuitry 50. This circuitry subtracts from signal 40 the signal 100 applied to its other input terminal. For example, this may be done by a subtraction of the current of signal 100 from the current of signal 40. Signal 100 is described in more detail below.

The output signal 60 of combiner 50 is applied to clock and data recovery ("CDR") circuitry 70. This circuitry is designed to recover a digital data signal 80 from the signal 60 applied to it. CDR circuitry 70 may also recover a clock signal from signal 60. Output signal 80 may also be referred to as a retimed data signal. Signal 80 is preferably delayed by one unit interval ("UI") relative to incoming signal 20. (A unit interval is the duration of one data bit in the data signal being processed.) Signal 80 is typically output to other circuitry that will actually interpret and make use of the information (data) represented by that signal. Examples of CDR circuitry are shown in references such as Aung et al. U.S. patent application Ser. No. 09/805,843, filed Mar. 13, 2001, Lee et al. U.S. patent application Ser. No. 10/059,014, filed Jan. 29, 2002, Lee et al. U.S. Pat. No. 6,650,140, Venkata et al. U.S. patent application Ser. No. 10/273,899, filed Oct. 16, 2002, Venkata et al. U.S. patent application Ser. No. 10/317,264, filed Dec. 10, 2002, Venkata et al. U.S. patent application Ser. No. 10/349,541, filed Jan. 21, 2003, Venkata et al. U.S. Pat. No. 6,867,616, Churchill et al. U.S. patent application Ser. No. 10/713,877, filed Nov. 14, 2003, Asaduzzaman et al. U.S. patent application Ser. No. 10/668,900, filed Sep. 22, 2003, Asaduzzaman et al. U.S. patent application Ser. No. 10/672,901, filed Sep. 26, 2003, Venkata et al. U.S. patent application Ser. No. 10/670,845, filed Sep. 24, 2003, Wang et al. U.S. patent application Ser. No. 10/740,120, filed Dec. 17, 2003, Kwasniewski et al. U.S. patent application Ser. No. 10/739,445, filed Dec. 17, 2003, and Shumarayev et al. U.S. patent application Ser. No. 11/040,342, filed Jan. 21, 2005.

Signal 80 is applied to decision feedback equalizer ("DFE") circuitry 90. This is preferably circuitry that operates somewhat like digital filter circuitry to produce an output signal 100 in which transitions in retimed data signal 80 are emphasized. Circuitry 90 is preferably circuitry that is controllable by other associated circuitry (e.g., associated PLD circuitry) to operate at the data rate of signal 80. Circuitry 90 is also preferably controllable with respect to how much emphasis or boost it gives to each transition in signal 80, how long after each transition that boost lasts, what shape the boost has, etc.

The output signal 100 of DFE circuitry 90 is applied to the subtraction input terminal of combiner circuitry 50, described earlier.

FIGS. 2a-2g are traces of typical signals at various points relative to circuitry 10 that are useful in further explaining the operation and effects of various components of the FIG. 1 circuitry. All of FIGS. 2a-2g are plotted against the same horizontal time base. All of the signals shown in FIGS. 2a-2g are differential signals, meaning that information is transmitted by the relative polarities of a pair of signals. One of these signals is shown using a solid line; the other signal is shown using a dotted line. The duration of one unit interval is shown at UI in FIG. 2a. Thus the differential signal shown in FIG. 2a may represent the data 110110100.

Figure 2A:
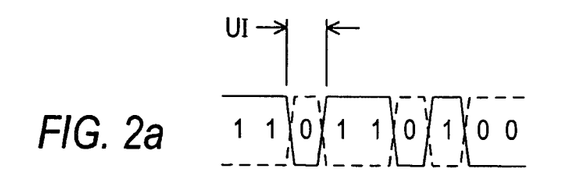
FIGS. 2a-2g are illustrative signal traces that are useful in explaining certain aspects of the invention.

FIG. 2a shows a typical differential data signal as transmitted by transmitter circuitry (not shown in FIG. 1, but transmitting what becomes signal 20 to receiver circuitry 10). It will be noted that the condition of the FIG. 2a signal is very good. It has steep and well-defined transitions between its levels, and there are also strong polarity reversals between the constituent signals.

Figure 2B:
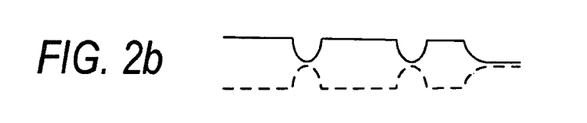

After the differential signal of FIG. 2a has traveled through a transmission medium from the transmitter to circuitry 10, the condition of the signal (i.e., now signal 20) may be as shown in FIG. 2b. As shown in this FIG., transitions in the signal have lost some of their sharpness and steepness. In addition, the polarities of the constituent signals are no longer reversing. These signal loss and/or attenuation phenomena may make it difficult or even impossible for CDR circuitry 70 to accurately interpret a signal like 20 and produce an acceptable retimed data signal 80.

Figure 2C:
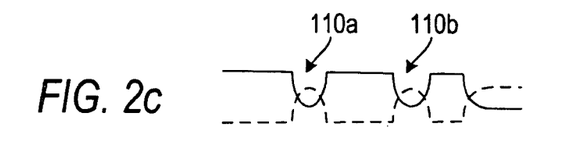

FIG. 2c shows the effect of FFE circuitry 30 on signal 20, at least early in the operation of circuitry 10. FIG. 2c therefore shows signal 40, at least during the above-mentioned early period of circuit operation. FFE circuitry 30 is able to increase the strength of the transitions in the signal sufficiently to restore some polarity reversal to the constituent signals. Whereas in FIG. 2b, the "eyes" at 110a and 110b are not opening, in FIG. 2c these eyes are opening to at least some degree. This is therefore a signal on which CDR circuitry 70 can begin to operate.

Figure 2D:
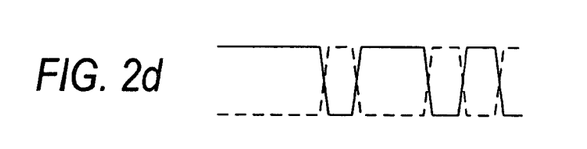

FIG. 2d shows the output signal 80 of CDR circuitry 70 in response to the signal shown in FIG. 2c. Note that the signal in FIG. 2d is delayed by exactly one UI relative to the signal in FIG. 2c. (If CDR circuitry 70 does not provide one full UI of delay, the delay of circuitry 70 can be supplemented in the DFE feedback loop by DFE circuitry 90.)

Figure 2E:
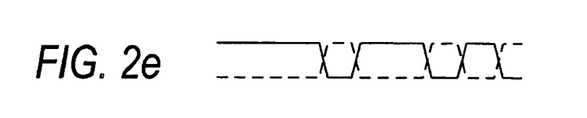

FIG. 2e shows the output signal 100 of DFE circuitry 90 in response to the signal shown in FIG. 2d. It is emphasized that FIG. 2e shows the result of the simplest possible configuration of DFE circuitry 90. This is a configuration in which circuitry 90 applies only a first order of emphasis to transitions in signal 80 (FIG. 2d) and then scales down the entire resulting signal. If DFE circuitry 90 is configured to have a higher-order response to transitions in signal 80, the shape of signal 100 may be more complex than that shown in FIG. 2e. For example, signal 100 may rise/fall by a greater amount after each transition and then pull back somewhat until the next transition. However, the relatively simple example shown in FIG. 2e will be sufficient to illustrate the general operating principles of the invention.

Figure 2F:
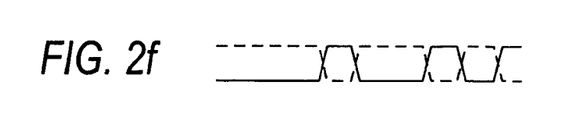

FIG. 2f shows the inversion of the signal in FIG. 2e that results from applying that signal to the negatively polarized input terminal of combiner circuitry 50 in FIG. 1.

Figure 2G:
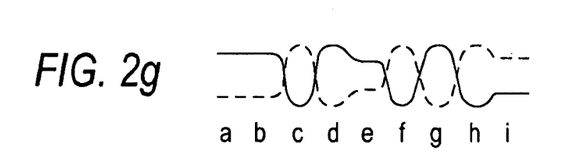

FIG. 2g shows the result of adding the signal in FIG. 2f to the signal in FIG. 2c. This is the effect of combiner circuitry 50 after CDR circuitry 70 and DFE circuitry 90 begin to operate. FIG. 2g therefore shows signal 60 under these somewhat later operating conditions of the circuitry.

To facilitate the following discussion of FIG. 2g, the UIs shown in that FIG. are labelled a-i from left to right. In UIs a and b the amplitude of the signal in FIG. 2g is somewhat diminished relative to the amplitude of the signal in FIG. 2c. This is the result of signal in FIG. 2f somewhat counteracting the signal in FIG. 2c in these UIs. In UI c, however, the signal in FIG. 2f adds to the amplitude of the signal in FIG. 2c. This is highly desirable because it helps to open the eye that follows the first transition in the depicted signal (compare the size of the eye in UI c in FIG. 2c with the significantly larger eye in that UI in FIG. 2g). In UI d the signal in FIG. 2f again adds to the signal in FIG. 2c. This again helps to open the eye that follows the second transition in FIG. 2g. In UI e the amplitude of the signal in FIG. 2g settles back as a result of the signal in FIG. 2f no longer adding to the signal in FIG. 2c. In UI f the signal in FIG. 2f again adds to the signal in FIG. 2c, thereby again more widely opening the eye that follows the third transition in FIG. 2g. The same thing happens again in UIs g and h following the fourth and fifth transitions. In UI i amplitude settles back somewhat, similar to what is shown in UI e.

The foregoing shows how the DFE feedback loop serves to enhance equalization in circuitry 10.

Figure 3:
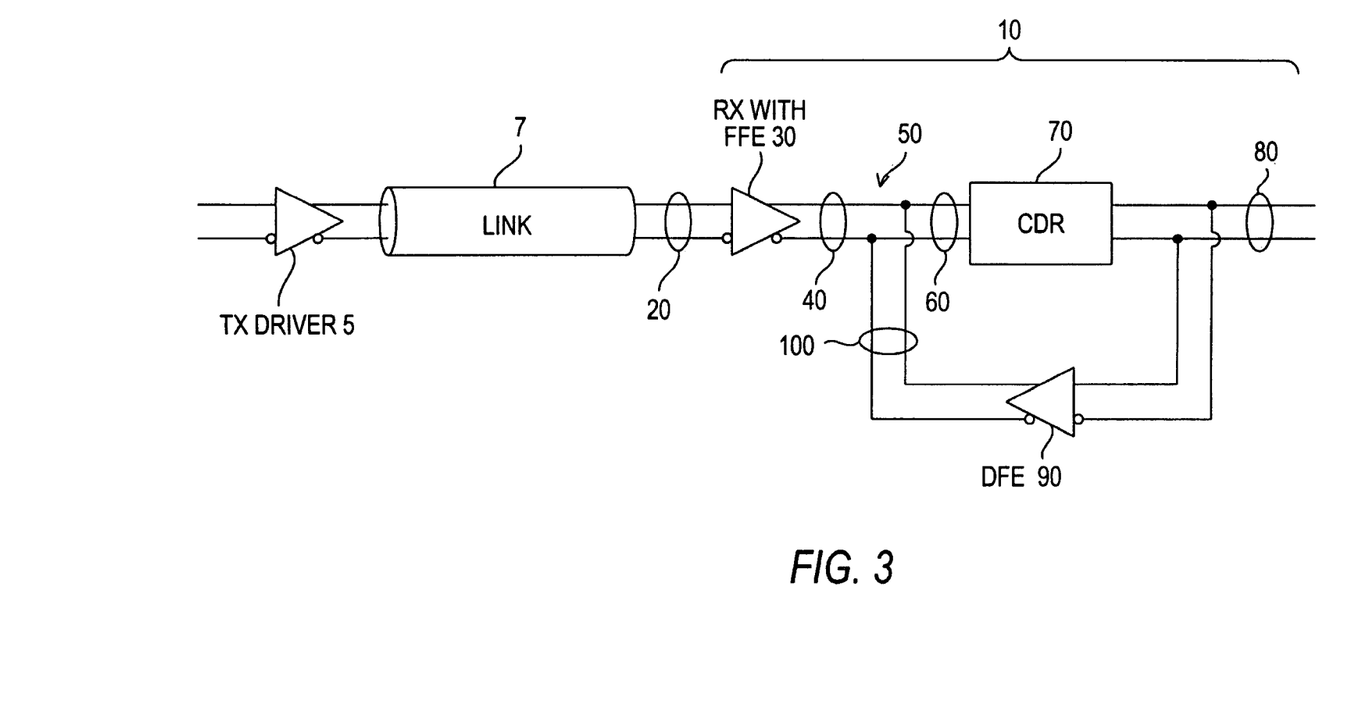
FIG. 3 is another simplified, schematic-block-diagram depiction of circuitry of the type shown in FIG. 1 in accordance with the invention.

FIG. 3 is another version of FIG. 1 in which the use of differential signals is shown explicitly. FIG. 3 also expressly shows the output driver 5 of transmitter circuitry and typical transmission link 7 from the transmitter to circuitry 10. Output driver 5 is the source of the signal shown in FIG. 2a, and transmission link 7 causes the signal degradation that is illustrated by FIG. 2b. The remainder of FIG. 3 parallels what is shown in FIG. 1.

Figure 4:
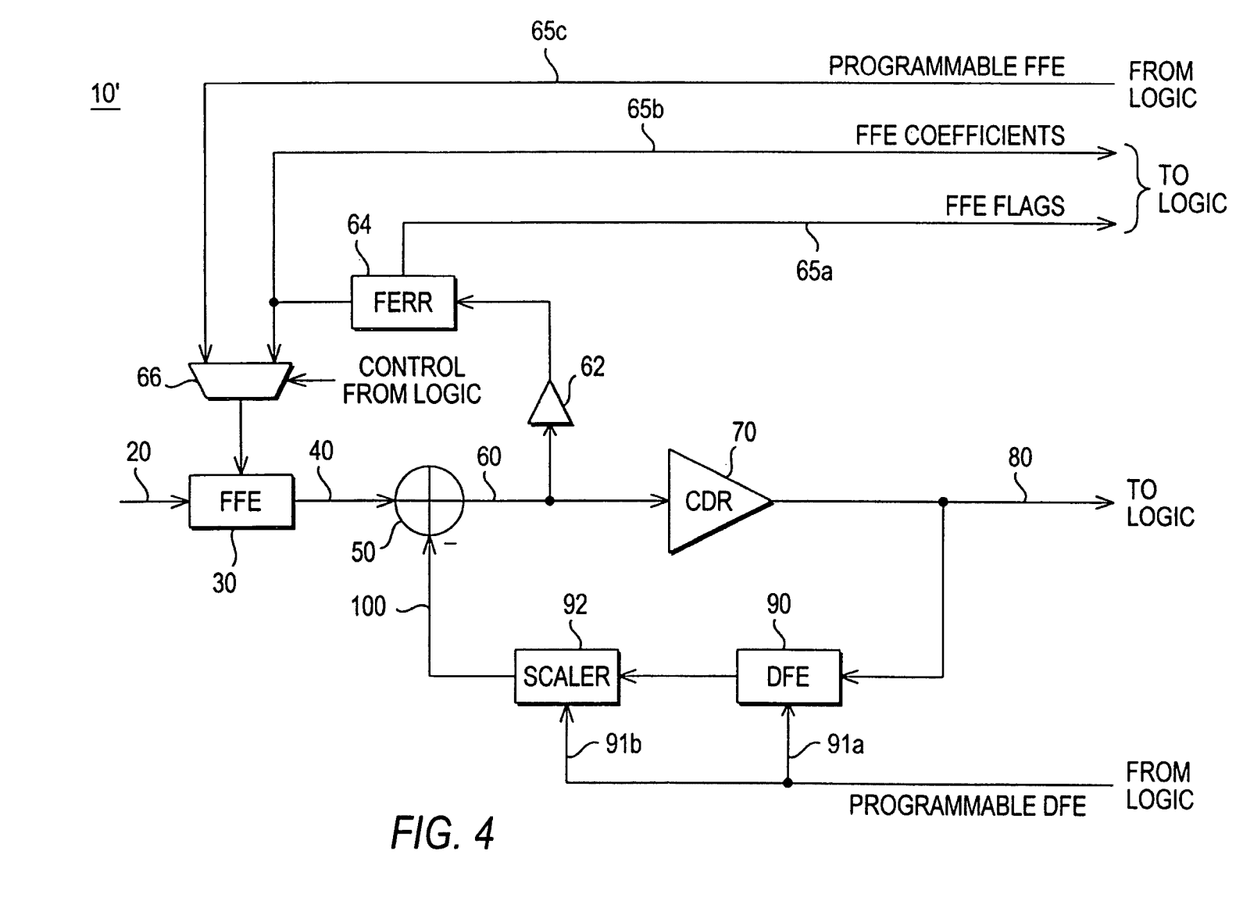
FIG. 4 is a simplified schematic block diagram of an illustrative, more elaborate embodiment of circuitry constructed in accordance with the invention.

A more highly developed embodiment 10' of circuitry 10 is shown in FIG. 4. Circuitry 10' includes an adaptive FFE loop (elements 62, 64, and the right-hand path through multiplexer 66). FERR circuitry 64 can provide coefficients for controlling the operation of FFE circuitry 30. FERR circuitry determines the coefficient values to be used based on the output signal(s) of buffer/rectifier circuitry 62. Circuitry 62 compares one or more selected characteristics of signal 60 to reference characteristics and produces one or more error signals to indicate how much signal 60 deviates from the reference(s). Circuitry 64 then selects coefficient values that are intended to reduce the detected error(s). Giving FFE circuitry 30 this adaptive capability allows circuitry 30 to adapt to equalizing a signal 20 having any of a wide range of equalization needs.

Lead or bus 65a allows circuitry 64 to send to other associated circuitry (e.g., associated PLD core circuitry) flag signals that indicate various operating conditions of circuitry 64. Examples of possible flag signals are a signal to indicate when the adaptive loop does not appear to be operating properly, when it does appear to be operating properly, when coefficients are stable, when coefficients are about to change, etc.

Lead or bus 65b allows circuitry 64 to send to other associated circuitry (e.g., associated PLD core circuitry) the values of the coefficients that circuitry 64 is currently supplying to FFE circuitry 30.

As an alternative or addition to adaptive loop elements 62 and 64, the left-hand path through multiplexer 66 allows other associated circuitry (e.g., associated PLD core circuitry) to provide one or more coefficients used by FFE circuitry 30. As just one example of this, the circuitry may be initially operated using adaptive loop elements 62 and 64 to find the best values for FFE coefficients. When satisfactory and stable operation has been achieved, associated circuitry (e.g., associated PLD core circuitry) may switch multiplexer 66 from passing coefficients supplied by circuitry 64 to supplying coefficients (e.g., the optimally valued coefficients) from the associated circuitry via leads 65c.

Another feature shown in FIG. 4 is the ability to supply coefficients used by DFE circuitry 90 from associated circuitry (e.g., associated PLD core circuitry) via leads 91a. FIG. 4 also shows that the signal scaling function of the DFE loop can be separated (in element 92) from the equalizer function (element 90). The scaling performed by scaler circuitry 92 is illustrated by the drop in signal amplitude from FIG. 2d to FIG. 2e. FIG. 4 further shows that the magnitude of the scaling performed by scaler circuitry 92 can be controlled by signals supplied via leads 91b from other associated circuitry (e.g., associated PLD core circuitry).

Figure 5A:
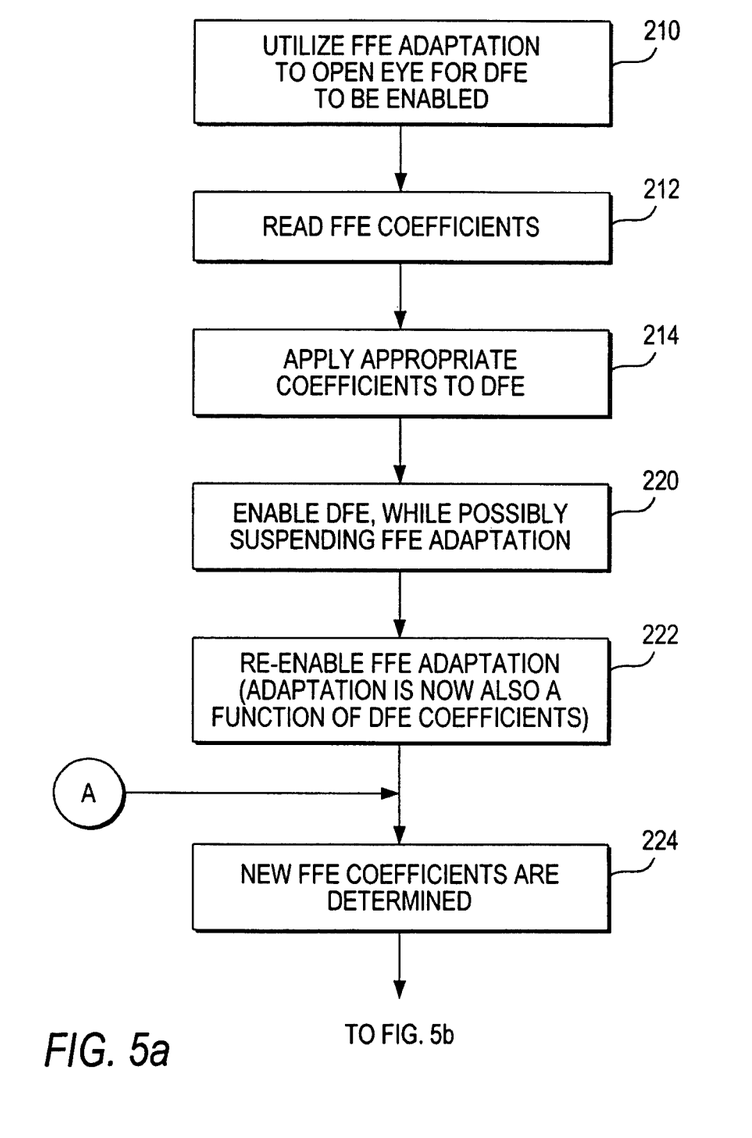
FIGS. 5a and 5b are collectively a simplified flow chart of an illustrative embodiment of certain method aspects of the invention.
Figure 5B:
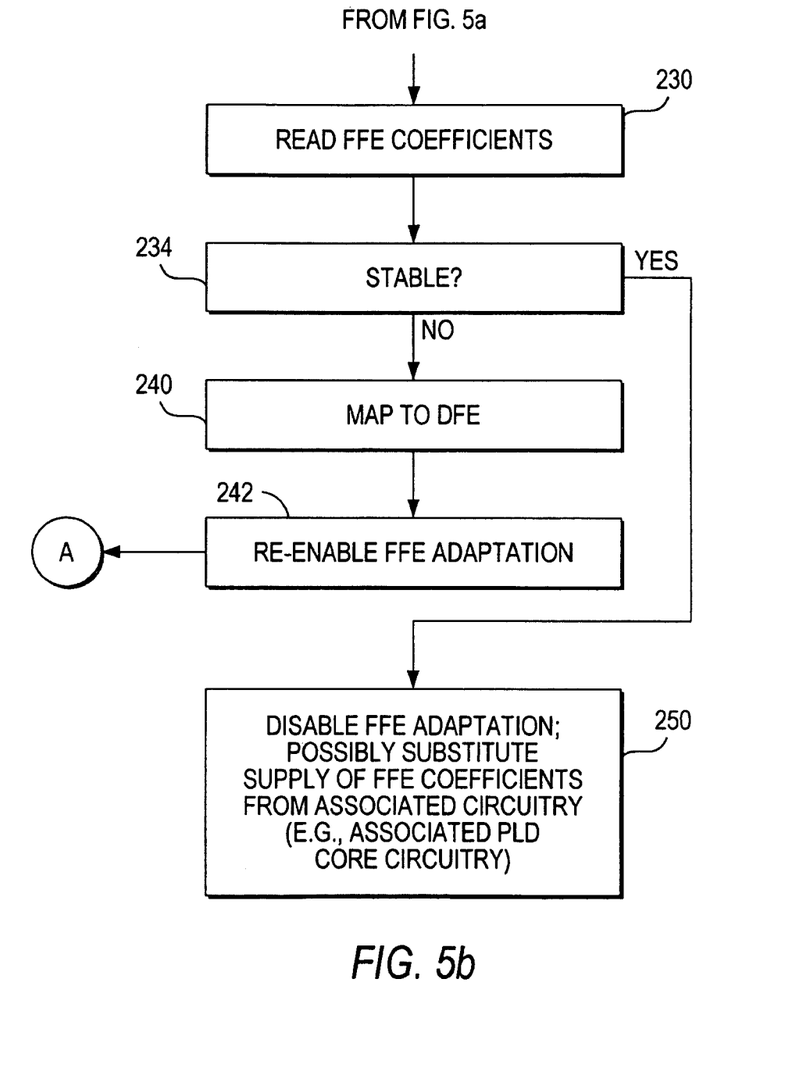

FIG. 5a and 5b collectively illustrate a method of operating circuitry of the type shown in FIG. 4 in accordance with another possible aspect of the invention. At the start of an equalization operation (step 210), FFE adaption (elements 30, 50, 62, 64, 66) is used to open the eyes in signal 20 sufficient for DFE circuitry 90 to be enabled. This may correspond to operation like that shown in FIG. 2c. DFE circuitry 90 may be disabled at this time. Bus 91a may include an enable/disable lead for this purpose.

In step 212 the FFE coefficients that the FFE adaptation loop arrives at are read out via leads 65b.

In step 214 appropriate coefficients (based at least in part on the FFE coefficients read out in step 212) are applied to DFE circuitry 90 and/or 92 via leads 91a and/or 91b.

In step 220, DFE circuitry 90/92 is enabled to operate with the coefficients supplied to it in step 214. As step 220 indicates, it may be desirable to temporarily suspend FFE adaptation while DFE circuitry 90/92 is coming on line so that only one aspect of the circuitry is in flux at any given time.

In step 222, FFE adaptation is re-enabled. Adaptation is now also a function of DFE because the output of DFE circuitry 90/92 is an input (via circuitry 50) to the FFE adaptation loop.

The resumption of FFE adaptation in step 222 may result in new FFE coefficients being determined as in step 224.

In step 230 these new FFE coefficients are read out and tested for stability in step 234. The stability determination may be based on whether the new FFE coefficients are significantly different from the previous values of these coefficients. If not, stability has been reached, and control accordingly passes from step 234 to step 250. If the FFE coefficients are still changing, stability has not yet been reached, and control accordingly passes from step 234 to step 240.

In step 240 the new FFE coefficient information is appropriately mapped to new DFE coefficient information, which is supplied to DFE circuitry 90/92 via leads 91a/b.

In step 242 FFE adaptation is enabled again and control returns to step 224 for another iteration.

In step 250 (mentioned earlier as being performed after stability has been detected in step 234) FFE adaptation is disabled. At this point, multiplexer 66 can be switched to supply the FFE coefficients from leads 65c rather than the FFE adaptation loop.

The method shown in FIGS. 5a and 5b and described above has a number of advantages. One of these is avoidance of feed-through DFE error propagation, because the incoming signal is already opened wide enough by FFE before DFE is allowed to start. If DFE starts prematurely, it can operate falsely and give exactly the wrong type of equalization. This can perpetuate itself through the DFE feedback loop, with the possible result that proper operation is never established. Another advantage is that equalization coefficients are gradually transferred from FFE to DFE. This approach allows for further reduction in bit error rate ("BER") because the DFE system (unlike FFE) does not amplify a complete input spectrum, but operates rather based on programmed data rate. Still another advantage is that it effectively achieves DFE adaptation from FFE adaptation. In other words, one adaptation engine (for FFE) and the programmability of associated PLD circuitry also makes possible DFE adaptation. In addition to FFE coefficients, FFE flags are being read out into the PLD, which allows not only incrementing of programmed DFE coefficients, but also their decrement, provided that FFE flags have indicated that the incoming signal is over-equalized.

Figure 6:
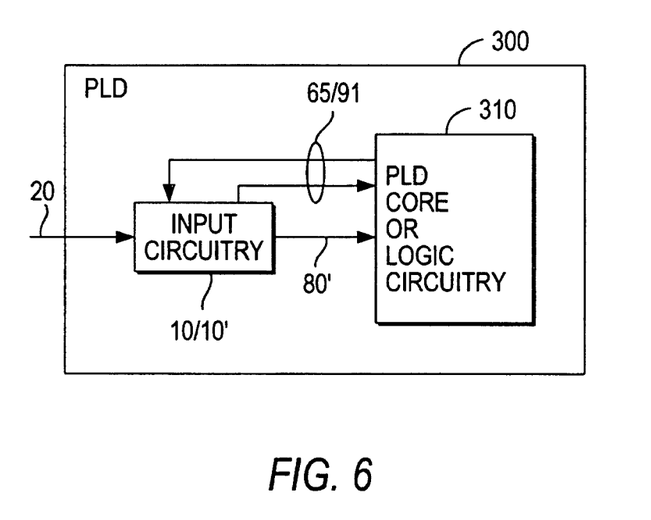
FIG. 6 is a simplified block diagram of an illustrative embodiment of a programmable logic device in accordance with the invention.

FIG. 6 shows an illustrative embodiment of circuitry 10 or 10' (as described above) in a programmable logic device ("PLD") 300. Circuitry 10/10' receives input signal 20 and applies recovered data signal 80' to the PLD core or logic circuitry 310 of device 300. Reference number 80' (rather than 80) is used in FIG. 6 because recovered data signal 80 in any of the earlier FIGS. may be further processed before being applied PLD core 310. As just one example of such further processing, serial recovered data signal 80 may be converted to several parallel signals 80' for application to PLD core 310. PLD core 310 may also receive signals like 65a and 65b from input circuitry 10 as shown, for example, in FIG. 4. Input circuitry 10 may receive signals like 65c, 91a, and 91b from PLD core 310, as is also shown in FIG. 4.

It will be understood that the foregoing is only illustrative of the principles of the invention, and that various modifications can be made by those skilled in the art without departing from the scope and spirit of the invention. For example, any of a wide range of CDR or CDR-type circuits can be used for element 70 in FIGS. 1, 3, and 4.

What is claimed is:

1. Equalization circuitry comprising:
   selection circuitry operative to select either a first coefficient value received from control circuitry while the control circuitry is adapting to an input signal or a second coefficient value received from logic circuitry when an indication of stability is received by the logic circuitry, wherein:
   buffer circuitry, coupled between an input of the control circuitry and the input signal, provides an error signal that indicates an amount of deviation of characteristics of the input signal and reference characteristics to the control circuitry;
   the first coefficient value changes as the control circuitry adapts to the input signal;
   the control circuitry provides the changing first coefficient value to the logic circuitry; and
   the second coefficient value is equal to a value of the changing first coefficient value last received by the logic circuitry when the logic circuitry received the indication of stability, wherein a third coefficient value that corresponds to the second coefficient value is applied to a decision-feedback equalization that is disabled while the control circuitry is adapting a first time to the input signal when the indication of stability is received by the logic circuitry.

2. The equalization circuitry defined in claim 1 wherein the input signal comprises a differential signal.

3. The equalization circuitry defined in claim 1, wherein the logic circuitry receives the indication of stability from the control circuitry and the logic circuitry controls the selection made by the selection circuitry.

4. The equalization circuitry defined in claim 1 further comprising:
   feed-forward equalizer circuitry that receives the selected coefficient value for operating on the input signal;
   combiner circuitry for combining an output signal of the feed-forward equalizer circuitry and a selectively enabled feedback signal;
   data recovery circuitry for recovering a digital data signal from an output signal of the combiner circuitry; and
   decision-feedback equalizer circuitry for operating on the digital data signal to produce the selectively enabled feedback signal.

5. The equalization circuitry defined in claim 4 wherein the data recovery circuitry and the decision-feedback equalizer circuitry collectively have a delay of one digital data signal unit interval between the output signal of the feed-forward equalizer circuitry and the feedback signal.

6. The equalization circuitry defined in claim 4 wherein the feed-forward equalizer circuitry comprises equalizer adaptation circuitry.

7. The equalization circuitry defined in claim 6 wherein the equalizer adaptation circuitry comprises feed-forward equalizer coefficient determining circuitry.

8. The equalization circuitry defined in claim 6 further comprising:
   circuitry for selectively enabling operation of the equalizer adaptation circuitry.

9. The equalization circuitry defined in claim 4 wherein the decision-feedback equalizer circuitry is variably operable based on at least one selectable decision-feedback equalizer coefficient.

10. The equalization circuitry defined in claim 9 further comprising circuitry for basing the at least one decision-feedback equalizer coefficient at least in part on an operating characteristic of the feed-forward equalizer circuitry.

11. The equalization circuitry defined in claim 10 wherein the operating characteristic of the feed-forward equalizer circuitry is adaptively selectable.

12. The equalization circuitry defined in claim 4 further comprising:
   circuitry for selectively enabling operation of the decision-feedback equalizer circuitry.

13. The equalization circuitry of claim 4 further comprising control circuitry configured to:
   adjust a characteristic of the feed-forward equalizer circuitry based on the error signal to adapt to the input signal.

14. The equalization circuitry of claim 13 wherein the characteristic is a coefficient value.

15. The equalization circuitry of claim 13 wherein:
   the logic circuitry is coupled to the control circuitry; and
   the selection circuitry is operative to output the selected coefficient value to the feed-forward equalizer circuitry.

16. The equalization circuitry defined in claim 1 wherein a flag signal, coupled between the control circuitry and the logic circuitry, provides the indication of stability and wherein the control circuitry is bypassed when the flag signal with the indication of stability is received by the logic circuitry.

17. The equalization circuitry defined in claim 1 wherein the control circuitry is disabled when the third coefficient value that corresponds to the second coefficient value is applied to a decision-feedback equalization.

18. A method of equalizing an input signal comprising:
   providing from control circuitry a first coefficient value to a first input of a selection circuit and logic circuitry, wherein the first coefficient value changes as the control circuitry is adapting a first time to the input signal;
   providing from the logic circuitry a second coefficient value to a second input of the selection circuit, wherein the second coefficient value is equal to a value of the changing first coefficient value last received by the logic circuitry;
   providing from buffer circuitry, coupled between an input of the control circuitry and the input signal, an error signal that indicates an amount of deviation of characteristics of the input signal and reference characteristics to the control circuitry;

selecting the first input for use in equalizing the input signal while the control circuitry is adapting to the input signal;
selecting the second input for use in equalizing the input signal when a first indication of stability is received by the logic circuitry; and
applying a third coefficient value that corresponds to the second coefficient value to a decision-feedback equalization that is disabled while the control circuitry is adapting a first time to the input signal when the indication of stability is received by the logic circuitry.

19. The method defined in claim 18 further comprising:
subjecting the input signal to feed-forward equalization using the selected input as a coefficient value;
combining an output signal of the feed-forward equalization with a selectively enabled feedback signal;
subjecting an output signal of the combining to data recovery; and
subjecting an output signal of the data recovery to decision-feedback equalization to produce the selectively enabled feedback signal.

20. The method defined in claim 19 wherein during an initial period of operation the feedback signal is not enabled.

21. The method defined in claim 19 wherein the feedback signal is selectively enabled by selectively enabling the decision-feedback equalization.

22. The method defined in claim 19 wherein the feed-forward equalization is performed adaptively.

23. The method defined in claim 22 wherein the adaptive performance of the feed-forward equalization can change at least one coefficient used in the feed-forward equalization.

24. The method defined in claim 23 further comprising:
deriving at least one coefficient for use in the decision-feedback equalization from the at least one coefficient used in the feed-forward equalization.

25. The method defined in claim 23 wherein the adaptive performance of the feed-forward equalization is based at least in part on the output signal of the combining.

26. The method defined in claim 25 further comprising:
deriving at least one coefficient for use in the decision-feedback equalization from the at least one coefficient used in the feed-forward equalization.

27. The method defined in claim 26 further comprising:
after the deriving, adaptively performing the feed-forward equalization to change the at least one coefficient used in the feed-forward equalization.

28. The method defined in claim 27 further comprising:
after the adaptively performing, deriving a new value for the at least one coefficient used in the decision-feedback equalization from the changed coefficient used in the feed-forward equalization.

29. The method of claim 19 further comprising:
adjusting a characteristic of the feed-forward equalization based on the error signal to adapt to the input signal.

30. The method of claim 29 wherein the characteristic is a coefficient value.

31. The method defined in claim 19 further comprising:
disabling the decision-feedback equalization while the control circuitry is adapting the first time to the input signal; and
when the logic circuitry receives the indication of stability:
applying a third coefficient value that corresponds to the second coefficient value to the decision-feedback equalization; and
enabling the decision-feedback equalization.

32. The method defined in claim 31 further comprising:
selecting the first input of the selection circuit while the control circuitry is adapting a second time to the input signal and changes the first coefficient value;
applying a fourth coefficient value that corresponds to the changing first coefficient value to the decision feedback equalization while the control circuitry is adapting the second time to the input signal; and
selecting the second input of the selection circuit when a second indication of stability is received by the logic circuit.

33. A programmable logic device comprising:
programmable logic circuitry; and
selection circuitry operative to select either a first coefficient value received from control circuitry while the control circuitry is adapting to a serial data signal or a second coefficient value received from the programmable logic circuitry when an indication of stability is received by the programmable logic circuitry, wherein:
buffer circuitry, coupled between an input of the control circuitry and the serial data signal, provides an error signal that indicates an amount of deviation of characteristics of the input signal and reference characteristics to the control circuitry;
the first coefficient value changes as the control circuitry adapts to the serial data signal;
the control circuitry provides the changing first coefficient value to the logic circuitry; and
the second coefficient value is equal to a value of the changing first coefficient value last received by the logic circuitry when the logic circuitry received the indication of stability, wherein a third coefficient value that corresponds to the second coefficient value is applied to a decision-feedback equalization that is disabled while the control circuitry is adapting a first time to the input signal when the indication of stability is received by the logic circuitry.

34. The programmable logic device of claim 33 further comprising control circuitry configured to:
adjust a characteristic of the feed-forward equalizer circuitry based on the error signal to adapt to the input signal.

35. The programmable logic device of claim 34 wherein the characteristic is a coefficient value.

36. The programmable logic device of claim 34 wherein the selection circuitry is operative to output the selected coefficient value to the feed-forward equalizer circuitry.

37. The programmable logic device defined in claim 33 further comprising:
feed-forward equalizer circuitry that receives the selected coefficient for performing an equalization operation on the serial data signal applied to the device;
combiner circuitry for combining an output signal of the feed-forward equalizer circuitry with a selectively enabled feedback signal;
data recovery circuitry for operating on an output signal of the combiner circuitry to produce a recovered data signal for use by the programmable logic circuitry; and
decision-feedback equalizer circuitry for performing an equalization operation on the recovered data signal to produce the selectively enabled feedback signal.

38. The device defined in claim 37 wherein the decision-feedback equalizer circuitry is at least partly responsive to the programmable logic circuitry with respect to the equalization operation performed by the decision-feedback equalizer circuitry.

39. The device defined in claim 37 further comprising:
 circuitry for applying signals indicative of the equalization operation being performed by the feed-forward equalizer circuitry to the programmable logic circuitry.

\* \* \* \* \*